(12) United States Patent
Lee et al.

(10) Patent No.: US 11,055,025 B2
(45) Date of Patent: Jul. 6, 2021

(54) SEMICONDUCTOR MEMORY DEVICE PERFORMING COMMAND MERGE OPERATION AND OPERATION METHOD THEREOF

(71) Applicants: SK hynix Inc., Icheon (KR); Seoul National University R&DB Foundation, Seoul (KR)

(72) Inventors: Hyokeun Lee, Seoul (KR); Moonsoo Kim, Seoul (KR); Hyun Kim, Seoul (KR); Hyuk-Jae Lee, Seongnam (KR)

(73) Assignees: SK hynix Inc., Icheon (KR); Seoul National University R&DB Foundation, Seoul (KR)

( * ) Notice: Subject to any disclaimer, the term of this patent is extended or adjusted under 35 U.S.C. 154(b) by 20 days.

(21) Appl. No.: 16/664,248

(22) Filed: Oct. 25, 2019

(65) Prior Publication Data
US 2020/0341686 A1    Oct. 29, 2020

(30) Foreign Application Priority Data
Apr. 29, 2019    (KR) .................. 10-2019-0049768

(51) Int. Cl.
*G06F 3/06* (2006.01)
*G06F 12/0875* (2016.01)

(52) U.S. Cl.
CPC .......... *G06F 3/0659* (2013.01); *G06F 3/0604* (2013.01); *G06F 3/0631* (2013.01); *G06F 3/0679* (2013.01); *G06F 12/0875* (2013.01); *G06F 2212/452* (2013.01)

(58) Field of Classification Search
CPC .. G06F 3/0659; G06F 3/0604; G06F 12/0875; G06F 3/0631; G06F 3/0679; G06F 2212/452; G06F 3/0655; G06F 3/0619
See application file for complete search history.

(56) References Cited

U.S. PATENT DOCUMENTS

| 7,328,317 | B2 | 2/2008 | Hillier, III et al. |
| 9,058,792 | B1 | 6/2015 | Edmondson et al. |
| 9,342,402 | B1 * | 5/2016 | Ong .................... G06F 11/1056 |

(Continued)

FOREIGN PATENT DOCUMENTS

KR    1005332296 B1    12/2005

OTHER PUBLICATIONS

Kultursay et al., "Evaluating STT-RAM as an energy-efficient main memory alternative," 2013, pp. 256-267, IEEE International Symposium on Performance Analysis of Systems and Software (ISPASS).

(Continued)

*Primary Examiner* — Sean D Rossiter

(57) ABSTRACT

A semiconductor memory device includes a memory device, a Read-Modify-Write (RMW) controller configured to generate a merge command corresponding to at least one command among a read command and a write command which are externally provided, to receive a processing result of the merge command, and to generate a response for the at least one command corresponding to the merge command. The semiconductor memory device further includes a memory controller configured to control the memory device by receiving the merge command and to provide the processing result of the merge command to the RMW controller.

24 Claims, 12 Drawing Sheets

(56) References Cited

U.S. PATENT DOCUMENTS

| | | | |
|---|---|---|---|
| 10,642,684 B1* | 5/2020 | MacLaren | G06F 11/1048 |
| 2009/0024807 A1 | 1/2009 | Hillier, III et al. | |
| 2009/0300297 A1* | 12/2009 | Ikeuchi | G06F 11/1008 |
| | | | 711/155 |
| 2018/0341432 A1* | 11/2018 | Ware | G11C 7/1009 |

OTHER PUBLICATIONS

Lee et al., "Architecting phase change memory as a scalable dram alternative," 2009, pp. 2-13, Proceedings of the 36th Annual International Symposium on Computer Architecture (ISCA).

Sparsh Mittal, "A survey of soft-error mitigation techniques for nonvolatile memories," Computers, Feb. 13, 2017, pp. 1-27, vol. 6, No. 1, MDPI.

"Intel and micron produce breakthrough memory technology," Jul. 28, 2015, 6 pages, Intel Corporation, https://newsroom.intel.com/news-releases/intel-andmicron-produce-breakthrough-memory-technology.

Shin et al., "Proteus: a flexible and fast software supported hardware logging approach for nvm," 50th Annual International Symposium on Microarchitecture (MICRO-50), Oct. 14-18, 2017, pp. 178-190, Cambridge, MA, USA.

Sundararaman et al., "Towards software defined persistent memory: Rethinking software support for heterogeneous memory architectures," 3rd Workshop on Interactions of NVM/FLASH with Operating Systems and Workloads (INFLOW'15), Oct. 4, 2015, pp. 6:1-6:10, ACM, Monterey, CA.

Dulloor et al., "System software for persistent memory," 9th European Conference on Computer Systems (EuroSys), Apr. 13-16, 2014, pp. 15:1-15:15.

Bhattacharjee et al., "Storage class memory aware data management," Bulletin of the IEEE Computer Society Technical Committee on Data Engineering, 2010, pp. 35-40, vol. 33, No. 4.

Wu et al., "Unimem: Runtime data managementon non-volatile memory-based heterogeneous main memory," International Conference for High Performance Computing, Networking, Storage and Analysis (SC), May 2, 2017, pp. 58:1-58:14.

"High-bandwidth memory reinventing memory technology," 2015, 1 page, AMD, https://www.amd.com/Documents/High-Bandwidth-Memory-HBM.pdf.

Fisher, "Optimizing nand flash performance," Flash Memory Summit, Aug. 2008, 2 pages, Micron Technology, Santa Clara, CA, USA.

Kim et al., "A 21nm high performance 64gb mlc nand flash memory with 400mb/s asynchronous toggle DDR interface," 2011 Symposium on VLSI Circuits—Digest of Technical Papers, 2011, pp. 196-197.

Kim et al., "Subpage programming for extending the lifetime of nand flash memory," 2015 Design, Automation Test in Europe Conference Exhibition (DATE), 2015, pp. 555-560.

Kim et al., "Improving performance and lifetime of large-page nand storages using erase-free subpage programming," the 54th Annual Design Automation Conference (DAC), Jun. 18-22, 2017, pp. 1-6, ACM, Austin TX, USA.

Seong et al., "Security refresh: Protecting phase-change memory against malicious wear out," IEEE Micro, 2011, pp. 119-127, vol. 31, No. 1, IEEE Computer Society.

Qureshi et al., "Enhancing lifetime and security of pcm-based main memory with start-gap wear leveling," the 42nd Annual International Symposium on Microarchitecture (MICRO), Dec. 12-16, 2009, pp. 14-23, ACM, New York, NY, USA.

Huang et al., "Security RBSG: Protecting phase change memory with security-level adjustable dynamic mapping," the 30th IEEE International Parallel and Distributed Processing Symposium (IPDPS), 2016, pp. 1081-1090, IEEE computer Society.

Yu et al., "Increasing endurance and security of phasechange memory with multi-way wear-leveling," IEEE Transactions on Computers, May 2014, vol. 63, No. 5, pp. 1157-1168, IEEE.

Yun et al., "Dynamic wear leveling for phasechange memories with endurance variations," IEEE Transactions on Very Large Scale Integration (VLSI) Systems, Sep. 2015, vol. 23, No. 9, pp. 1604-1615, IEEE.

"ECC Handling Issues on Intel XScale I/O Processors," Technical Note, Dec. 2003, 8 pages, 1st ed., Intel Corporation.

Jiang et al., "Improving write operations in mlc phase change memory," the 18th International Symposium on High Performance Computer Architecture (HPCA), 2012, pp. 201-210.

Qureshi et al., "Improving read performance of phase change memories via write cancellation and write pausing," the 16th International Symposium on High-Performance Computer Architecture (HPCA), 2010, pp. 1-11.

Castellani et al., "Comparative analysis of program/read disturb robustness for GeSbTe-based phase-change memory devices," IEEE 8th International Memory Workshop (IMW), 2016, pp. 1-4.

Kline et al., "Counter advance for reliable encryption in phase change memory," IEEE Computer Architecture Letters, Jul.-Dec. 2018, vol. 17, No. 2, pp. 209-212.

Chang et al., "Nvdimm-n cookbook: A soupto-nuts primer on using nvdimm-ns to improve your storage performance," SINA Tutorial, 2015, 41 pages, Storage Networking industry Association, http://www.snia.org/sites/default/orig/FMS2015/Chang-Sainio NVDIMM Cookbook.pdf.

Peglar et al., "Persistent memory, nvm programming model, and nvdimms," SINA, 2017, 41 pages, Storage Networking Industry Association, https://www.flashmemorysummit.com/English/Collaterals/Proceedings/2017/20170809 FR21 SNIA.pdf.

"Axi interface core," 2017, 1 page, Northwest Logic, https://nwlogic.com/products/docs/AXI Interface Core.pdf.

"Read-modify-write core," 2017, Northwest Logic, 1 page, https://nwlogic.com/products/docs/Read-Modify-Write Core.pdf.

Poremba et al., "Nvmain 2.0: A user-friendly memory simulator to model (non-)volatile memory systems," IEEE Computer Architecture Letters, Jul.-Dec. 2015, pp. 140-143, vol. 14, No. 2.

Choi et al., "A 20nm 1.8v 8gb pram with 40mb/s program bandwidth," 2012 IEEE International Solid-State Circuits Conference (ISSCC), Feb. 20, 2012, pp. 46-48.

Zeng et al., "Memory performance characterization of spec cpu2006 benchmarks using tsim," Physics Procedia, pp. 1029-1035, 2012, vol. 33.

Zhang et al., "Mellow writes: Extending lifetime in resistive memories through selective slow write backs," the 43rd Annual International Symposium on Computer Architecture (ISCA), 2016, pp. 519-531.

Zhao et al., "Firm: Fair and high-performance memory control for persistent memory systems," the 47th Annual International Symposium on Microarchitecture (MICRO), 2014, pp. 153-165.

Xia et al., "Hikv: A hybrid index key-value store for dram-nvm memory systems," 2017 USENIX Annual Technical Conference, Jul. 12-14, 2017, pp. 349-362, USENIX Association, Santa Clara, CA, USA.

Pelley et al., "Memory persistency," the 41st International Symposium on Computer Architecture (ISCA), 2014, pp. 265-276, IEEE.

Huang et al., "Nvram-aware logging in transaction systems," VLDB Endowment, 2014, pp. 389-400, vol. 8.

Joshi et al., "Atom: Atomic durability in non-volatile memory through hardware logging," the 23rd International Symposium on High Performance Computer Architecture (HPCA), 2017, pp. 361-372, IEEE Computer Society.

Villa et al., "A 45nm 1gb 1.8v phase-change memory," 2010 IEEE International Solid-State Circuits Conference (ISSCC), Feb. 9, 2010, pp. 270-271, IEEE.

* cited by examiner

FIG. 3

| D | U | V | B3 | | | B2 | | | B1 | | | B0 | | | CO-UNT |
|---|---|---|---|---|---|---|---|---|---|---|---|---|---|---|---|
| | | | M | L | T | DATA | M | L | T | DATA | M | L | T | DATA | |
| | | | | | | | | | | | | | | | |
| | | | | | | | | | | | | | | | |
| | | | | | | | | | | | | | | | |

| D | U | V | B3 | | | | B2 | | | | B1 | | | | B0 | | | | CO-UNT |
|---|---|---|---|---|---|---|---|---|---|---|---|---|---|---|---|---|---|---|---|
| | | | M | L | T | DATA | M | L | T | DATA | M | L | T | DATA | M | L | T | DATA | |
| 0 | 1 | 0 | 1 | 1 | W | [0xC0] | 1 | 0 | W | [0x80] | 0 | - | - | [0x40] | 1 | 0 | R | [0x00] | 1 |
| | 0 | 1 | | | | | | | | | | | | | | | | | |

110

SEMICONDUCTOR MEMORY DEVICE PERFORMING COMMAND MERGE OPERATION AND OPERATION METHOD THEREOF

CROSS-REFERENCE TO RELATED APPLICATIONS

The present application claims priority under 35 U.S.C. § 119(a) to a Korean Patent Application No. 10-2019-0049768, filed on Apr. 29, 2019, which are incorporated herein by reference in its entirety.

BACKGROUND

1. Technical Field

Various embodiments may generally relate to a semiconductor memory device performing a command merge operation and an operation method thereof, and more particularly, to a semiconductor memory device performing a command merge operation while performing a read-modify-write (RMW) operation and an operation method thereof.

2. Related Art

Phase change memory devices are attracting attention as next-generation memory devices because they have lower latency than flash memory devices and are accessible in units of bytes.

Lower latency, byte-accessible nonvolatile memory devices can be candidates for replacing both main memory devices and storage devices, and can be added as new memory layers in modern memory architectures.

A phase change memory device generally has a larger width for data operations inside the phase change memory device than a data width requested by a system. For example, in a system wherein data operations to a phase change memory may all be for 64 contiguous bytes, read and write operations performed within the phase change memory may all be for 256 contiguous bytes.

Accordingly, when a host wants to write data, a read-modify-write (RMW) operation must be frequently performed in the memory device to read data, modify a part thereof, and rewrite the modified data.

When the RMW operation is frequently performed, the processing speed of the memory device is reduced, thereby reducing the overall latency performance of the memory device and reducing the life of the memory device.

In addition, due to the RMW operation, the number of reads to the memory cells in the memory device is increased. As a result, there is may be an increase in read disturbance errors that cause undesired changes in data stored in the cells.

SUMMARY

In accordance with the present teachings, a semiconductor memory device may include a memory device, a Read-Modify-Write (RMW) controller configured to generate a merge command corresponding to at least one command among a read command and a write command which are externally provided, receive a processing result of the merge command, and generate a response for the at least one command corresponding to the merge command; and a memory controller configured to control the memory device by receiving the merge command and to provide the processing result of the merge command to the RMW controller.

In accordance with the present teachings, a computing device may include a host; and a semiconductor memory device, wherein the semiconductor may include a memory device, a Read-Modify-Write (RMW) controller configured to generate a merge command corresponding to at least one command among a read command and a write command which are externally provided, receive a processing result of the merge command, and generate a response for the at least one command corresponding to the merge command; and a memory controller configured to control the memory device by receiving the merge command and to provide the processing result of the merge command to the RMW controller.

In accordance with the present teachings, an operation method of a semiconductor memory device may include storing a read command and a write command which are externally provided to an input queue; storing a head command stored in the input queue into a Read-Modify-Write (RMW) cache; updating the RMW cache by searching for at least one command among read commands and write commands stored at the input queue each having an address that may be accessed with the head command and generating a merge command from the head command and the at least one command; receiving processing result corresponding to the merge command; updating the RMW cache according to the merge command and the processing result; and providing a response to the at least one command corresponding to the merge command with reference to the RMW cache.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed novelty, and explain various principles and advantages of those embodiments.

FIG. 3 is a table illustrating structure of a RMW cache according to an embodiment of the present disclosure.

FIGS. 5, 6, and 7 illustrate a merge operation and a demerge operation of the RMW controller according to an embodiment of the present disclosure.

DETAILED DESCRIPTION

The following detailed description references the accompanying figures in describing illustrative embodiments consistent with this disclosure. The embodiments are provided for illustrative purposes and are not exhaustive. Additional embodiments not explicitly illustrated or described are possible. Further, modifications can be made to presented embodiments within the scope of the present teachings. The detailed description is not meant to limit this disclosure. Rather, the scope of the present disclosure is defined in accordance with the presented claims and equivalents thereof.

Figure 1:
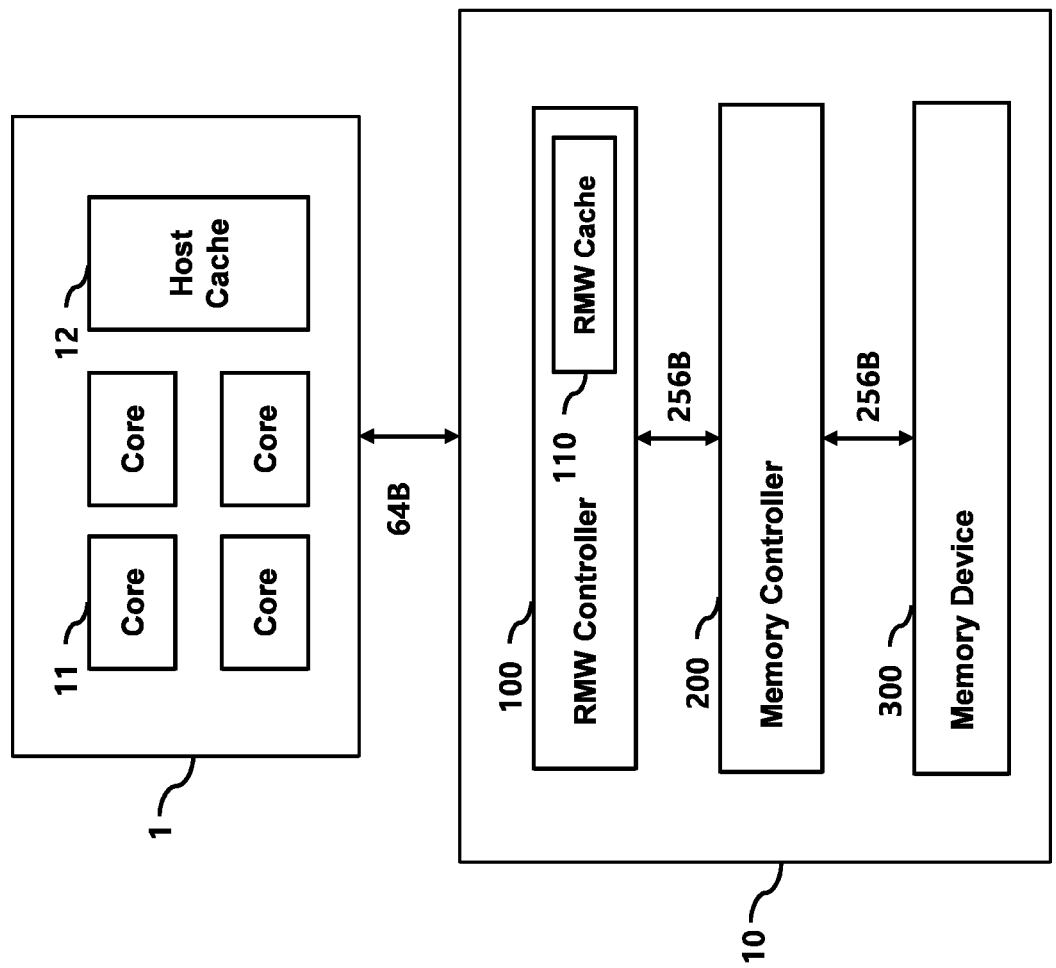
FIG. 1 is a block diagram illustrating a semiconductor memory device according to an embodiment of the present disclosure.

FIG. 1 is a block diagram illustrating a semiconductor memory device 10 according to an embodiment of the present disclosure.

The semiconductor memory device 10 includes a Read-Modify-Write (RMW) controller 100, a memory controller 200, and a memory device 300.

In the illustrated embodiment, a host 1 provides read commands and write commands to the semiconductor memory device 10. The data width of data exchanged between the host 1 and the semiconductor memory device 10 is 64 bytes, and the data width of data exchanged within the semiconductor memory device 10 is 256 bytes. Accordingly the data width of data exchanged between the host 1 and the semiconductor memory device 10 is smaller than the data width of data exchanged in the semiconductor memory device 10.

In the embodiment, 64 contiguous bytes of data may be represented as a block.

The host 1 may include a number of cores 11 and a host cache 12. The host 1 corresponds to a general purpose processor such as a central processing unit (CPU), and a detailed description thereof will be omitted.

In this embodiment, the RMW controller 100 receives read commands and write commands provided from the host 1 and controls the RMW operation inside the semiconductor memory device 10. A read command and a write command provided from the host 1 may be referred as a host read command and a host write command respectively.

Detailed configuration and operation of the RMW controller 100 will be described below.

The memory controller 200 provides a read command or a write command to the memory device 300 in response to a read command or a write command provided from the RMW controller 100.

In the illustrated embodiment, the read commands and the write commands to the memory device 300 are for 256-byte data.

In the present embodiment, the memory device 300 corresponds to a phase change memory (PCM) device or a memory cell array included in a PCM device.

Also, in the present embodiment, the memory controller 200 includes a configuration for reading or writing data to a PCM device or to a memory cell array of a PCM device.

In this embodiment, the memory controller 200 and the memory device 300 operate to read and write data in 256-byte units, and the RMW controller 100 also sends read or write commands to the memory controller 200 for data in 256-byte units, but embodiments are not limited thereto.

The memory controller 200 and the memory device 300 may be implemented through any technique including a conventional technique, and detailed description thereof will be omitted.

Figure 2:
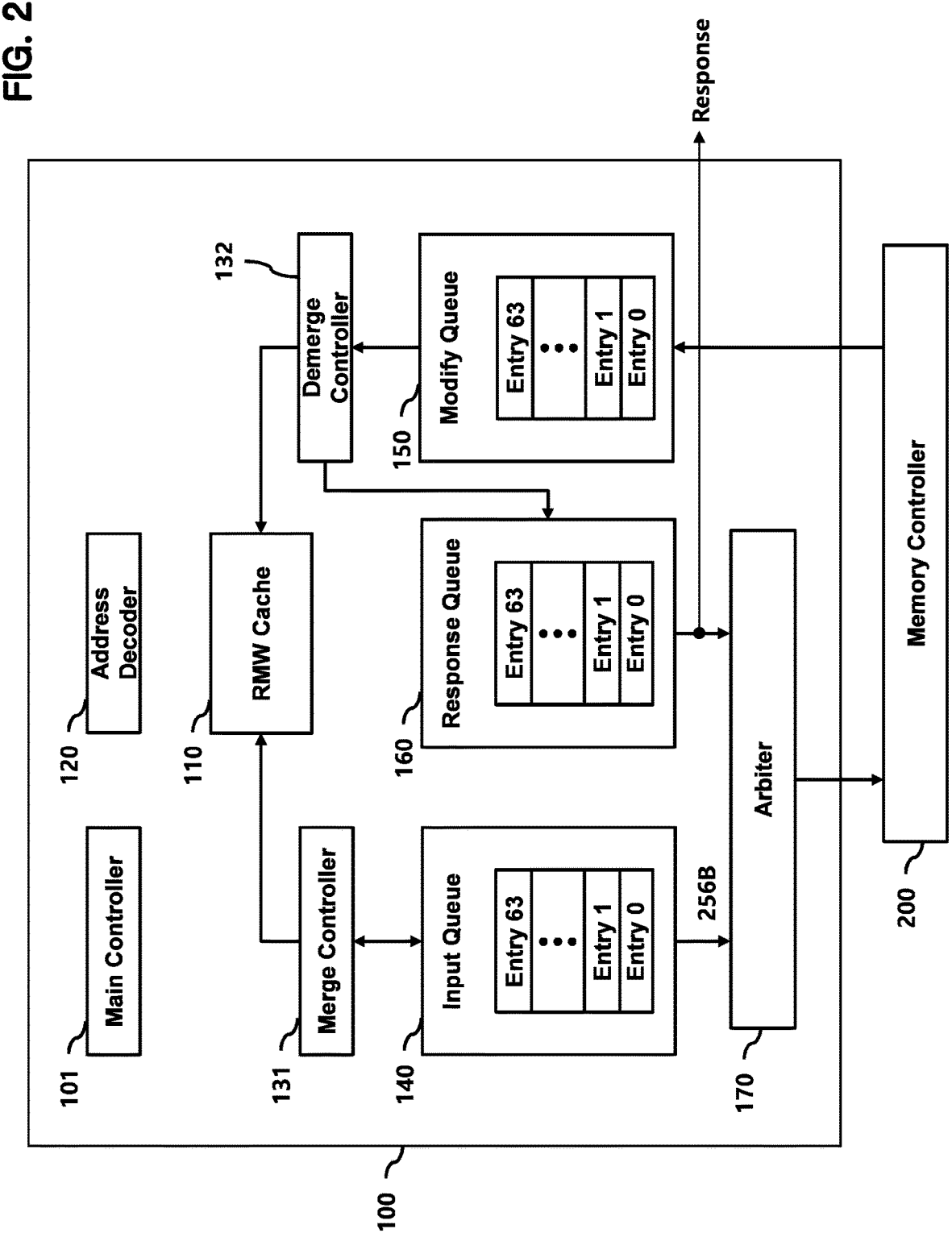
FIG. 2 is a block diagram illustrating a RMW controller according to an embodiment of the present disclosure.

FIG. 2 is a block diagram illustrating an RMW controller 100 according to an embodiment of the present disclosure.

The RMW controller 100 includes a main controller 101, an RMW cache 110, and an address decoder 120.

The main controller 101 controls general operations of the RMW controller 100.

The RMW cache 110 stores data and flags for the RMW operation performed in embodiments of the present disclosure.

Figure 3:
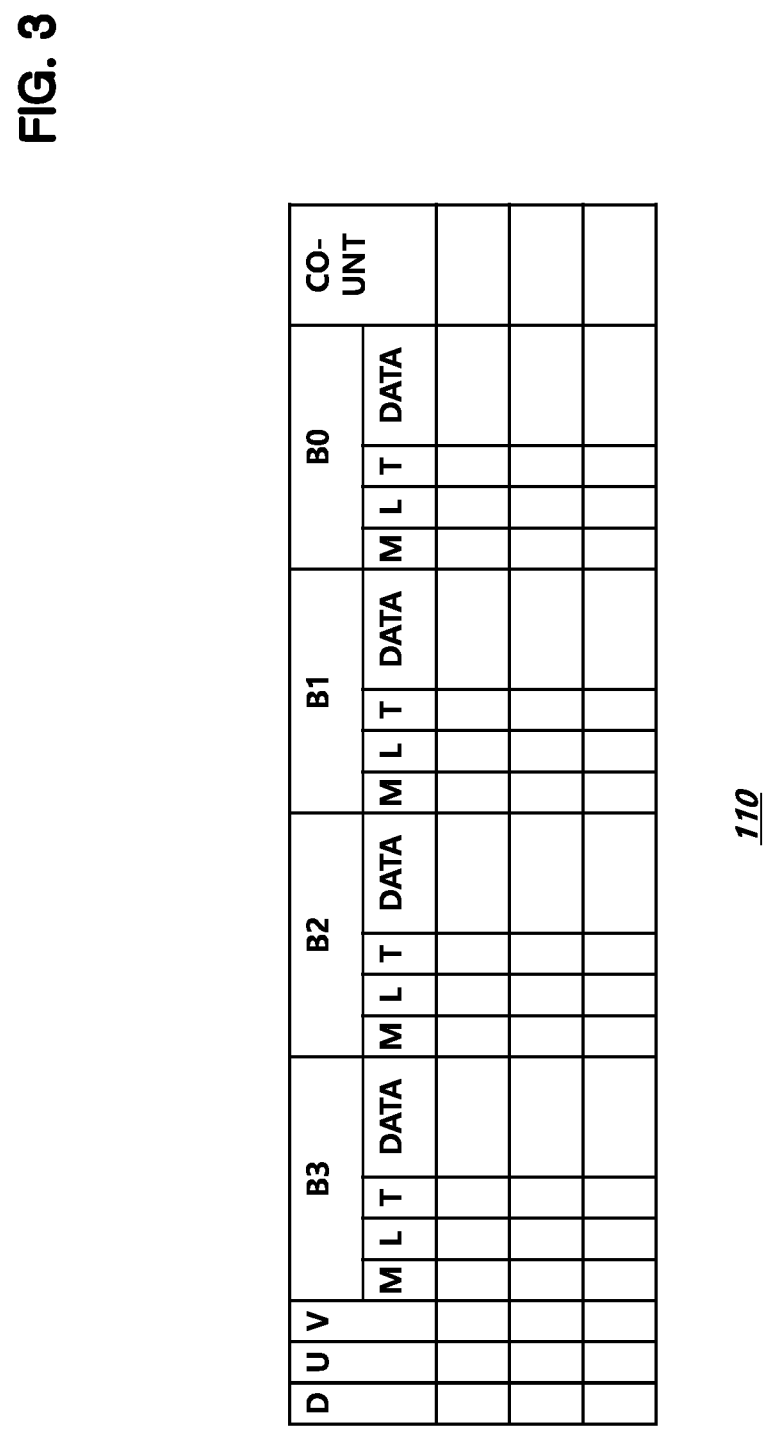

FIG. 3 is a table showing the structure of information in the RMW cache 110.

Each entry in the table corresponds to a cache line of the one or more cache lines included in the RMW cache 110.

The RMW cache 110 stores a dirty flag D, an in-process flag U, a valid flag V, four blocks, and a count value COUNT for each cache line.

The dirty flag D indicates whether data currently included in the corresponding entry is modified, and that therefore a write operation of the cache line to the memory is to be performed.

The in-process flag U indicates whether a command corresponding to the entry is currently being processed in the memory controller 200.

The valid flag V indicates whether all data of the current entry is valid.

The count value COUNT indicates number of accesses to the cache line.

In the present embodiment, the count value COUNT may be used to select a cache line for eviction from the RMW cache 110. For example, when a least recently used (LRU) eviction policy is used, the cache line having the smallest count value COUNT may be selected for eviction.

In the present embodiment, both the in-process flag U and the valid flag V are initially set to 0. When the cache line is allocated and new data is input, the in-process flag U is set to 1 and the valid flag V is set to 0. In response to the merge and demerge operations described below being completed for the cache line, the in-process flag U is set to 0 and the valid flag V is set to 1.

In this embodiment, each cache line includes four block fields respectively corresponding to four blocks, and each block stores and manages data in units of 64 bytes. Accordingly, each cache line may store and manage 256 bytes, including a first 64 bytes in block field B0, a second 64 bytes in block field B1, a third 64 bytes in block field B2, and a fourth 64 bytes in block field B3.

Each block field includes a merge flag M, a last write flag L, a command type flag T, and a 64-byte data field.

The merge flag M indicates whether data from a command corresponding to the block has been merged into the cache line.

The last write flag L indicates whether a write command corresponding to the block including that last write flag L is the last write command among the merged write commands in the cache line.

The use of the last write flag L is determined by the condition under which a write command is sent to the memory controller 200 from the RMW controller 100.

In an embodiment wherein a write command is sent from the RMW controller 100 to the memory controller 200 as a response to a cache line having a set dirty flag D being evicted from the RMW cache 110, the last write flag L may not be used.

However, when a write command is to be sent to the memory controller 200 as a response to a demerge operation, an operation efficiency may be improved by using a last write flag L. This will be described in more detail below.

The command type flag T indicates whether a command corresponding to a block is a write command W or a read command R.

The data field stores 64-byte data corresponding to a block.

The address decoder 120 determines whether a cache line in the RMW cache 110 as an address tag that corresponds to an address of a read or write command.

Figure 4:
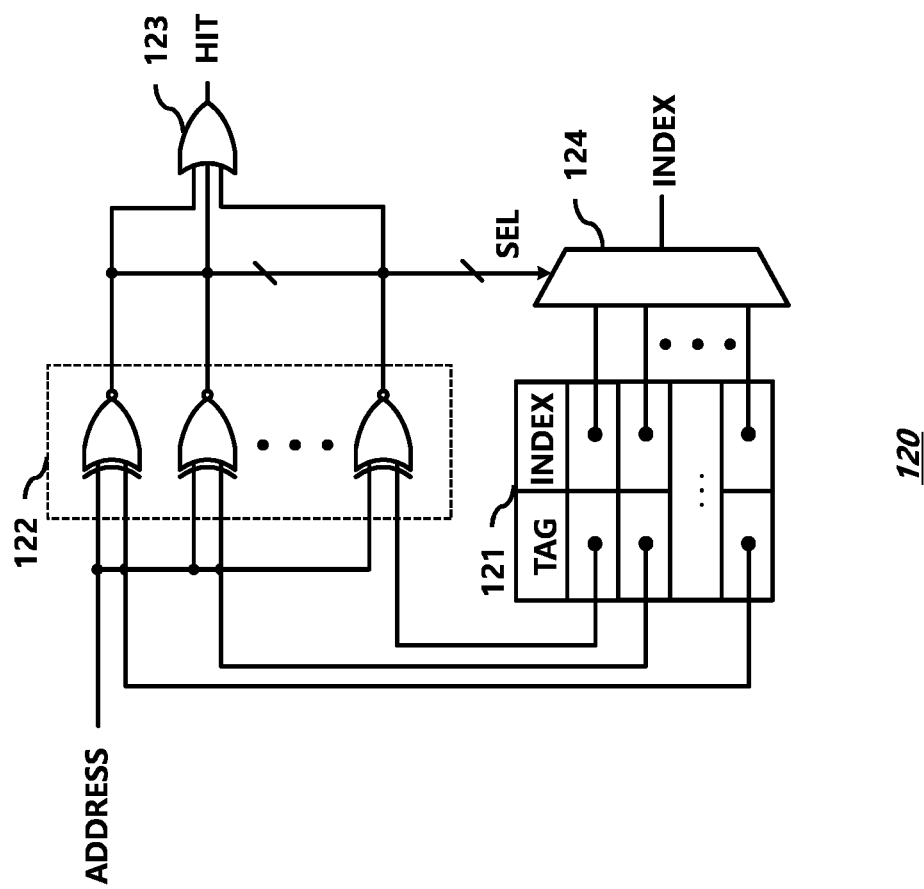
FIG. 4 is a block diagram illustrating an address decoder according to an embodiment of the present disclosure.

FIG. 4 is a block diagram illustrating a detailed structure of the address decoder 120.

The address decoder 120 includes a look up table (LUT) 121 that stores a plurality of tag-index pairs. The address decoder 120 shown in FIG. 4 corresponds to a fully-associative cache architecture wherein any cache line can store any address, but embodiments are not limited thereto. In other embodiments, the RMW cache 110 may use a set-associative cache architecture, a direct-mapped cache architecture, or the like, and the address decoder 120 would be adapted accordingly using a conventional technique.

The tag is information including some bits among the entire address bits that are compared with respective bits of an address corresponding to a command.

In the present embodiment, a number of entries in the LUT 121 is same as number of entries (that is, a number of cache lines) in the RMW cache 110, and the index information corresponds to a row number (that is, a line number) of the RMW cache 110.

The address decoder 120 further includes a comparison circuit 122, a hit decision circuit 123, and an index output circuit 124.

The comparison circuit 122 compares the bits of each tag of the LUT 121 with respective bits from a portion corresponding to tag information out of an input address corresponding to a command, and determines whether a tag of each row is included in the input address according to whether the bits are the same. For example, when each cache line holds 256 bytes, the input addresses in the commands are byte address and include 40 bits numbers 0 to 39, each tag may include 32 bits and may be compared to bits 8 to 39 of the input addresses. In such an embodiment where the block size is 64 bytes, bits 7 and 6 of the input address are used to determine a block within a cache line.

In this case, an XNOR operation is performed on respective corresponding bits of a tag of each row and the input address and the bit-wise XNOR results are combined using an AND gate (not shown). If the input address matches a tag of a row, a 1-bit signal corresponding to 1 is output for that row, indicating that the input address maps to an allocated cache line indicated by the index of the row. Otherwise, a 1-bit signal corresponding to 0 is output.

Accordingly, the comparison circuit 122 outputs a multi-bit decision signal SEL including respective decision results for all rows of the LUT 121.

The hit decision circuit 123 performs an OR operation on the respective bits of the multi-bit decision signal SEL, and outputs a signal HIT corresponding to 1 if there is at least one match, which represents a hit. Otherwise the hit decision circuit 123 outputs a signal HIT corresponding to 0, which represents a miss.

The index output circuit 124 outputs one index among a plurality of indices stored in the LUT 121 according to the multi-bit decision signal SEL. The index indicates a cache line of the RMW cache 110 that corresponds to the address of the input command.

When the multi-bit decision signal SEL is zero and, correspondingly, the HIT signal is zero, the index output circuit 124 may output NULL.

When a command is input to the main controller 101, the main controller 101 may provide the input address to the address decoder 120 to search whether an allocated cache line corresponding to the input address exists in the RMW cache 110.

When new information is input to a cache line of the RMW cache 110 or information of a cache line is updated, information of the LUT 121 is updated together so as to maintain consistency between the RMW cache 110 and the LUT 121.

In the present embodiment, the LUT 121 may be implemented with a register and the RMW cache 110 may be implemented with a DRAM.

Referring to FIG. 2, the RMW controller 100 further includes a merge controller 131, a demerge controller 132, an input queue 140, a modify queue 150, a response queue 160, and an arbiter 170.

The main controller 101 may perform basic data management operations of the input queue 140, the modify queue 150, and the response queue 160.

For example, the main controller 101 may control an operation of sequentially dequeuing a response from the response queue 160.

Figure 5:
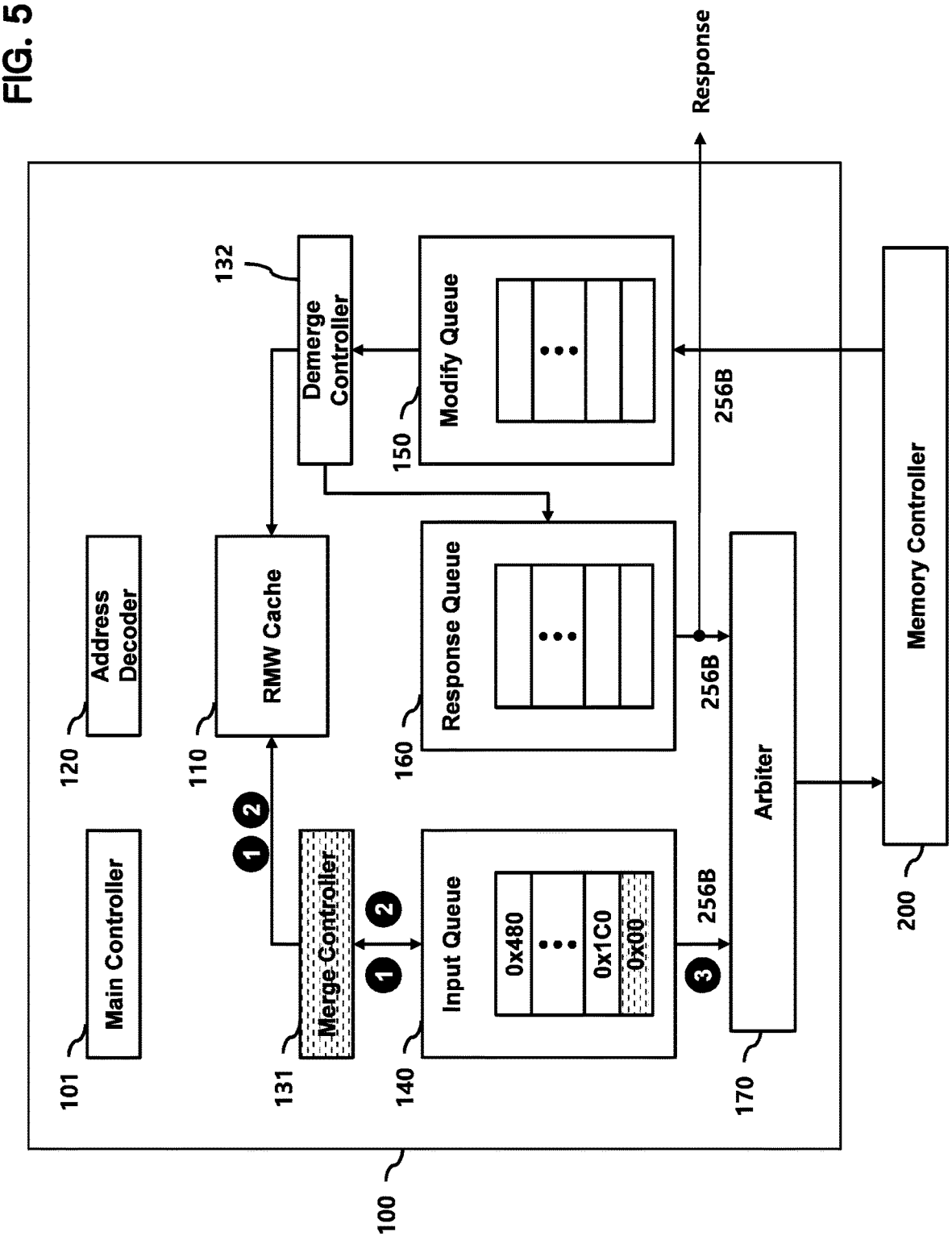
Figure 6:
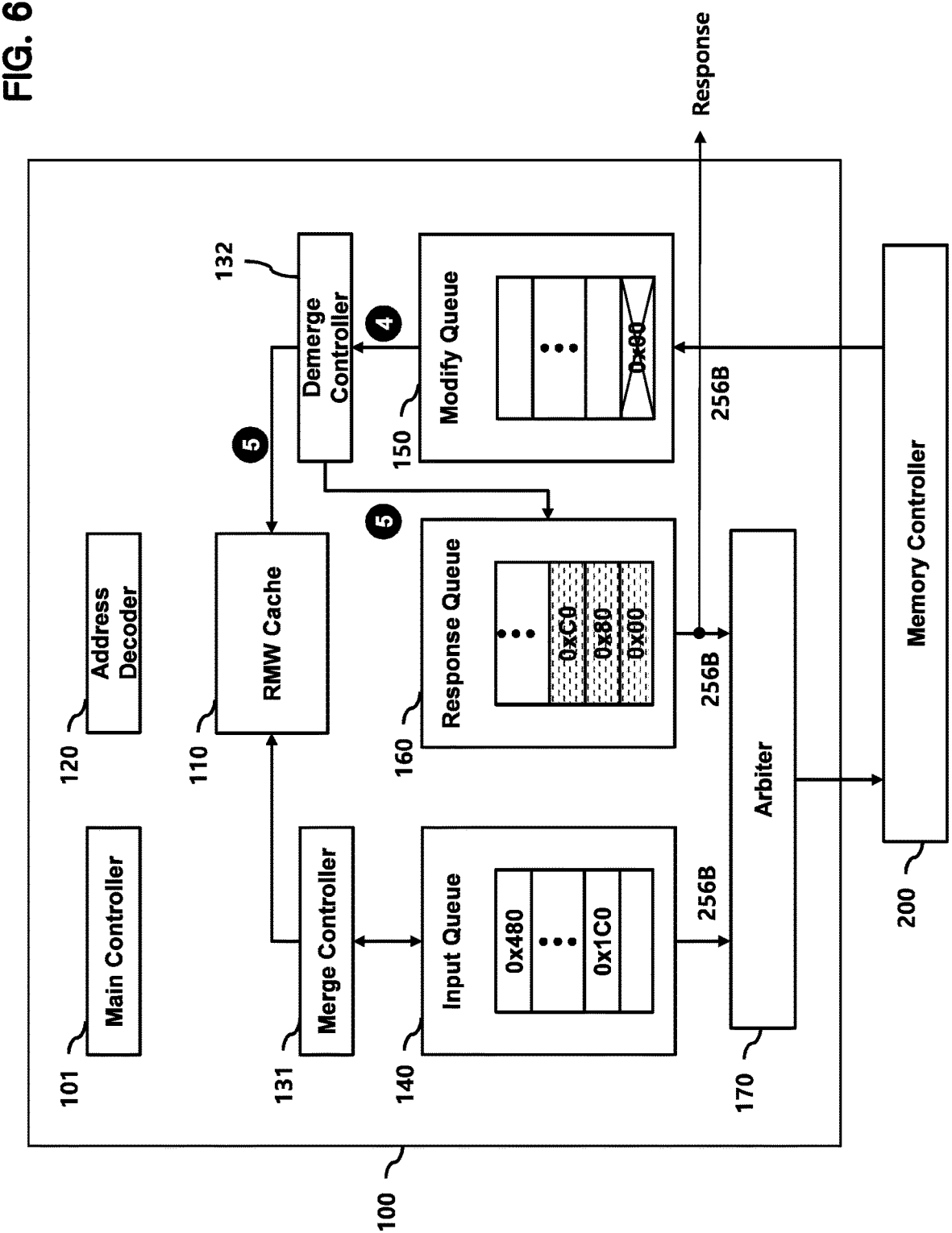

Hereinafter, operations of the merge controller 131, the demerge controller 132, the input queue 140, the modify queue 150, the response queue 160, and the arbiter 170 will be described with reference to FIGS. 5 through 7.

In the following, operations are indicated by numbers in black circles in FIGS. 5 to 7. The following disclosure assumes that the RMW cache 110 is empty.

(Operation 1) Head Command Processing Operation

First, a command corresponding to address 0x00 is input. Commands input to the RMW controller 100 are sequentially stored in the input queue 140. In the example described herein, the command is a read command, but embodiments are not limited thereto.

Hereinafter, a command corresponding to the address 0x00 will be referred to as a 0x00 command and commands for other addresses will be referred to in similar manners.

The merge controller 131 stores information about the head command of the input queue 140 in the RMW cache 110.

At this time, a cache line corresponding to the 0x00 command, which is the head command, is allocated and a corresponding block field (for example, block field B0 since bits 7 and 6 of the address of the 0x00 command are equal to 0) of the cache line is selected to store information on the head command.

When a cache line is newly allocated, the in-process flag U is set to 1 and the valid flag V is set to 0 in the newly allocated cache line.

After that, merge flag M is set to 1 in the block field corresponding to the 0x00 command, and command type flag T is set to R if the 0x00 command is a read command or to W if the 0x00 command is a write command.

For a write command, write data is stored in the data field, the dirty flag D of the cache line is set to 1 and the last write flag L of the corresponding block field in the cache line is set to 1.

(Operation 2) Command Merge Operation

The merge controller 131 waits for a predetermined waiting time (for example, 8 cycles in this embodiment) and merges the 0x00 command with one or more commands that can be merged with the 0x00 command when the command that can be merged with the 0x00 command is input to the input queue 140.

The command that can be merged with the 0x00 command is a command for an address that can be accessed with the 0x00 in the memory device 300 at the same time (in this embodiment, a command that falls within the same 256-byte data exchange operation within the memory device 300) and corresponds to a command for addresses 0x40, 0x80, and 0xC0 in this embodiment. Accordingly, commands than can be merged are commands that all map to a same allocated cache line in the RMW cache 110.

In this illustrative example, a 0xC0 command and a 0x80 command are sequentially input during the waiting time.

The 0xC0 command and the 0x80 command are sequentially input to the input queue 140.

The merge controller 140 sequentially searches the input queue 140, finds the 0x80 command and the 0xC0 command that can be merged with 0x00 commands, and updates the RMW cache 110 using information about the 0x80 and 0xC0 commands.

The merge controller 131 manages information of the merged commands using the RMW cache 110.

For the 0x80 and 0xC0 commands that are to be merged, the merged flags M in the respective corresponding block fields are set to 1 in the RMW cache 110.

Also the command type flags T flag in the respective corresponding block fields are set to R for the 0x00 command, which is a read command in this example, and to W for the 0x80 and 0xC0 commands, which are write commands in this example.

For a write command, write data is written in the data field of a corresponding block field and the dirty flag D of the cache line is set to 1.

In this embodiment, the last write flag L is set to 1 only for one of the write commands to be merged (in an embodiment, the most-recent write command to be merged), and the last write flags L for the rest of the write commands are set to 0.

The last write flag L may be useful when a write command is provided to the memory controller 200 after the demerge operation.

As described above, if issuing the write command to the memory controller 200 is limited to when a cache line is evicted, the last write flags L may be ignored.

As described above, in the present disclosure, a plurality of write commands may be merged together, a plurality of read commands may be merged together, or a combination of one or more write commands and one or more read commands may be merged together.

(Operation 3) Issuing a Merge Command

When the waiting time ends, the merge controller 131 generates a read command for 256-byte data corresponding to the cache line for which the merge operation waiting time has completed, and provides the read command to the arbiter 170. The arbiter 170 transmits a corresponding read command to the memory controller 200 according to its scheduling algorithm. The read command for 256-byte data may be referred as a merge command.

In this embodiment, the arbiter 170 performs scheduling in a first-come first-served (FCFS) manner, but embodiments are not limited thereto.

In response to the merge command being issued, the 0x00, 0x80, and 0xC0 commands that were merged into the cache line are removed from the input queue 140, and a 0x00 merge command indicating a merge command for reading the 0x00 address in the memory device 300 is input to the modify queue 150. In an embodiment, the merge command input to the modify queue 150 includes an indication of which block of the cache line corresponds to the head command.

(Operation 4) Receiving Processing Result for the Merge Command

In this example, it is assumed that the head command of the modify queue 150 is the 0x00 merge command.

When the result of processing the 0x00 merge command, which is the head command of the change queue 150, is provided from the memory controller 200, the demerge controller 132 begins a demerge operation.

(Operation 5) Demerge Operation

In response to receiving the result of processing a merge command, the demerge controller 132 updates information corresponding to the merge command in the RMW cache 110 with reference to the processing result which includes read data.

The demerge command updates data fields in block fields of a cache line that correspond to a read command (i.e., merge tag M=1 and command type flag T=R) or that do not correspond to any command (i.e., merge tag M=0). The demerge command does not update a data field in a block field corresponding to a write command (i.e., merge tag M=1 and command type flag T=W). After the demerge operation is completed, the in-process flag U and the valid flag V of the cache line are set to 0 and 1, respectively.

The demerge controller 132 generates separate commands for blocks in the cache line for which the merge flag M is set to 1, that is, the 0x00, 0x80 and 0xC0 commands, from the 0x00 merge command and stores the generated commands as response commands in the response queue 160. In the present example, a read response command corresponding to the 0x00 command, a write response command corresponding to the 0x80 command, and a write response command corresponding to the 0xC0 command may be stored in the response queue 160.

In response to the completion of the demerge command for the processing result of the 0x00 merge command, the 0x00 merge command, which is the head command of the modify queue 150, is deleted.

In this embodiment, the responses corresponding to the separated commands are stored in the response queue 160 in the order of their respective addresses.

A read response command may include a response signal along with the read data, which may be sent to the host 1 without passing through the arbiter 170.

For a write response command in which the last write flag L is set to 0, it is sufficient to notify a completion of the write operation to the host 1.

In an embodiment, for a write response command in which the last write flag L is set to 1 (here, the write response command corresponding to the 0xC0 command), a write command for all of the blocks in the corresponding cache line may be sent to the arbiter 170 as well as a notification of completion of the write operation for the address 0xC0. A write command for all of blocks in a corresponding cache line may be referred as an eviction or write-back command. Such an embodiment may correspond to a write-through cache architecture.

In response to the command to write all the blocks of a cache line, the memory controller 200 processes a write command for the corresponding cache line and the dirty flag D of the cache line may be set to 0.

In another embodiment, the write operation for all the blocks of the cache line is performed only when the cache line is evicted, such as when the cache line must be allocated to a new command from the host. Such an embodiment may correspond to a write-back cache architecture. In such an embodiment, it is sufficient to send only the notification of completion of the write operation to the host 1 regardless of the last write flag L.

In an embodiment, the eviction command for the cache line whose dirty flag D is set may also be stored in the response queue 160 along with the write data. When the eviction command is output from the response queue 160, the eviction command may be provided to the memory controller 200 via the arbiter 170 according to the scheduling algorithm of the arbiter 170.

The overall operation of providing commands to the arbiter 170 from the input queue 140 and the response queue 160 may be controlled via the main controller 101.

Figure 8:
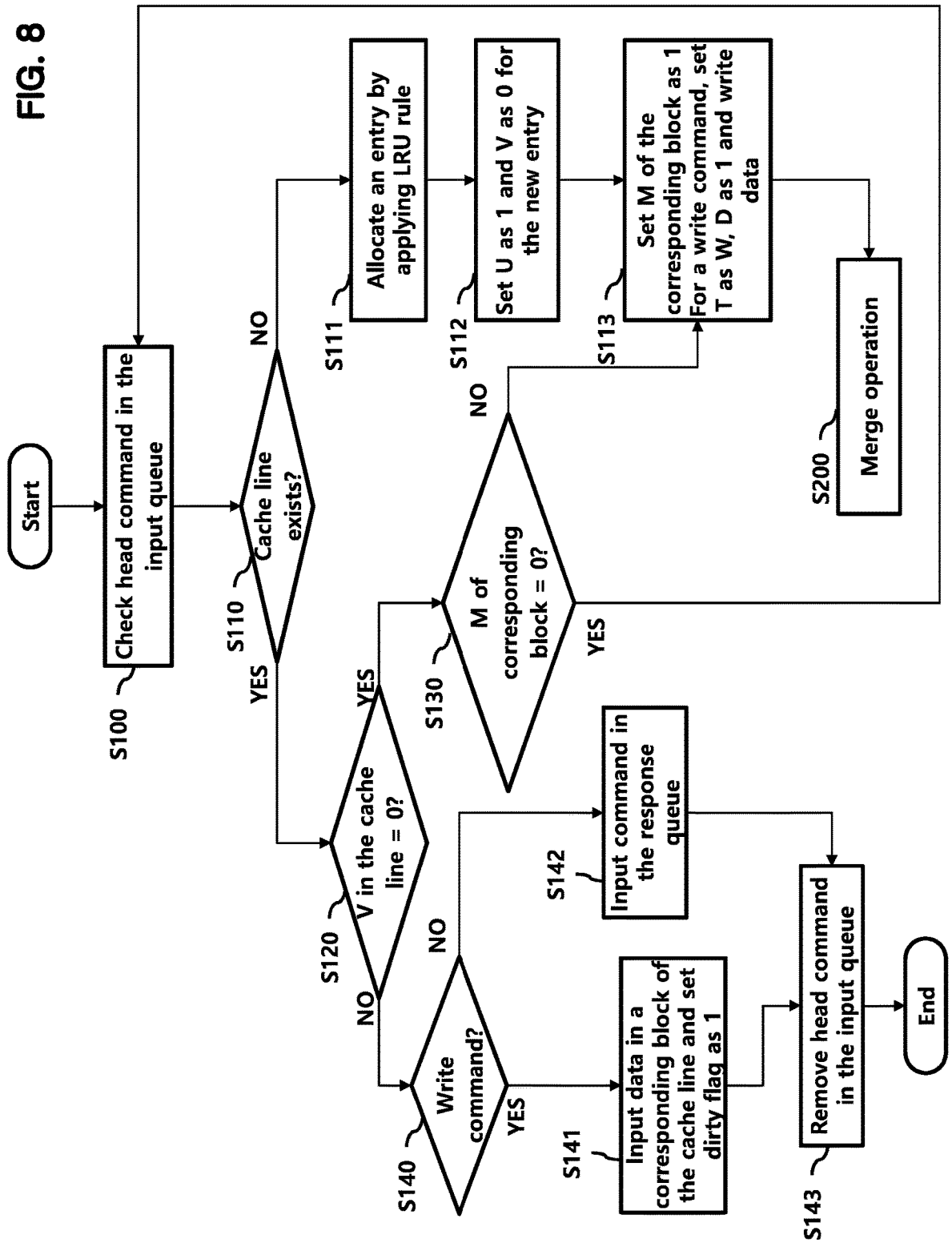
FIGS. 8, 9, and 10 are flow charts illustrating operations of the RMW controller according to an embodiment of the present disclosure.
Figure 9:
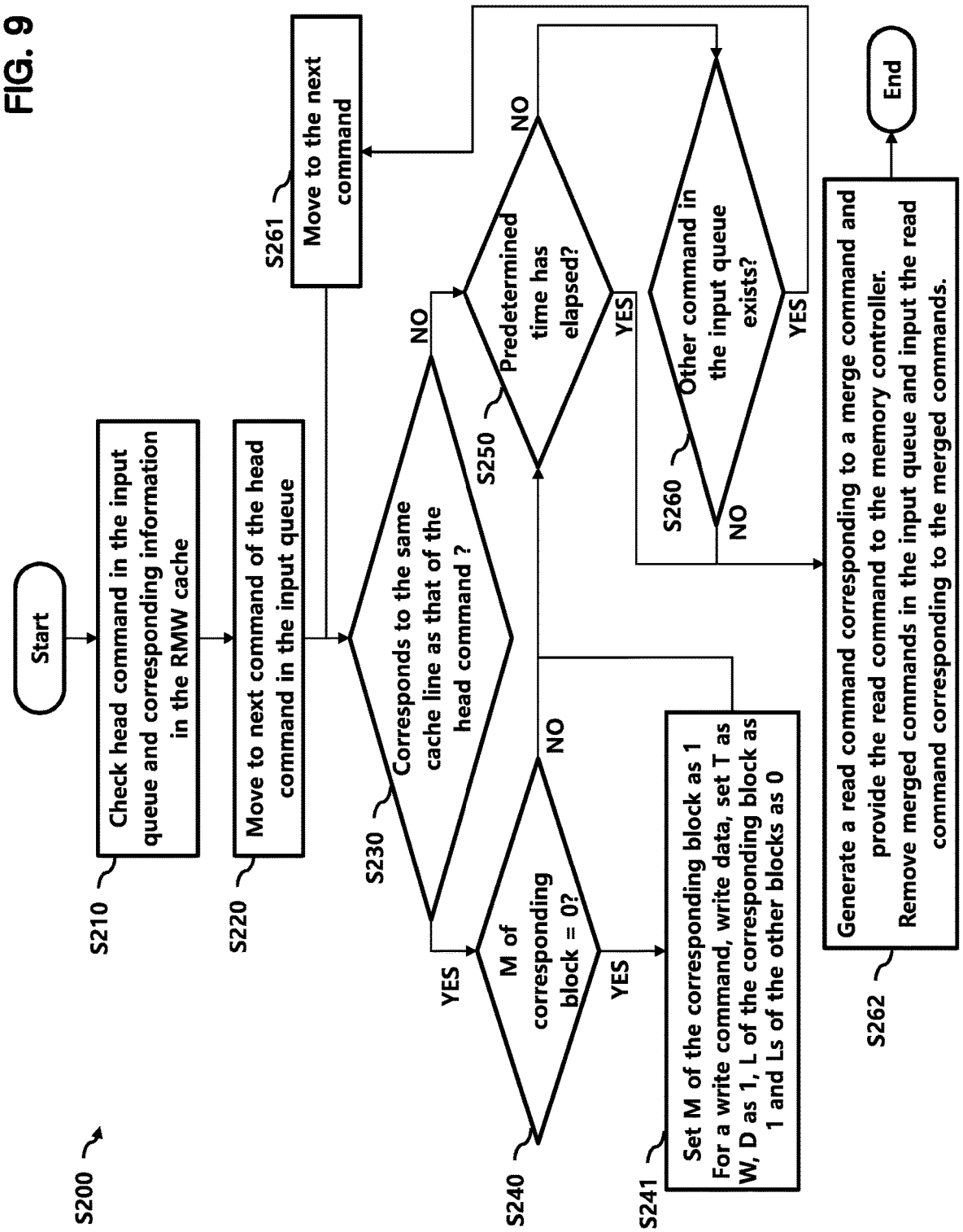
Figure 10:
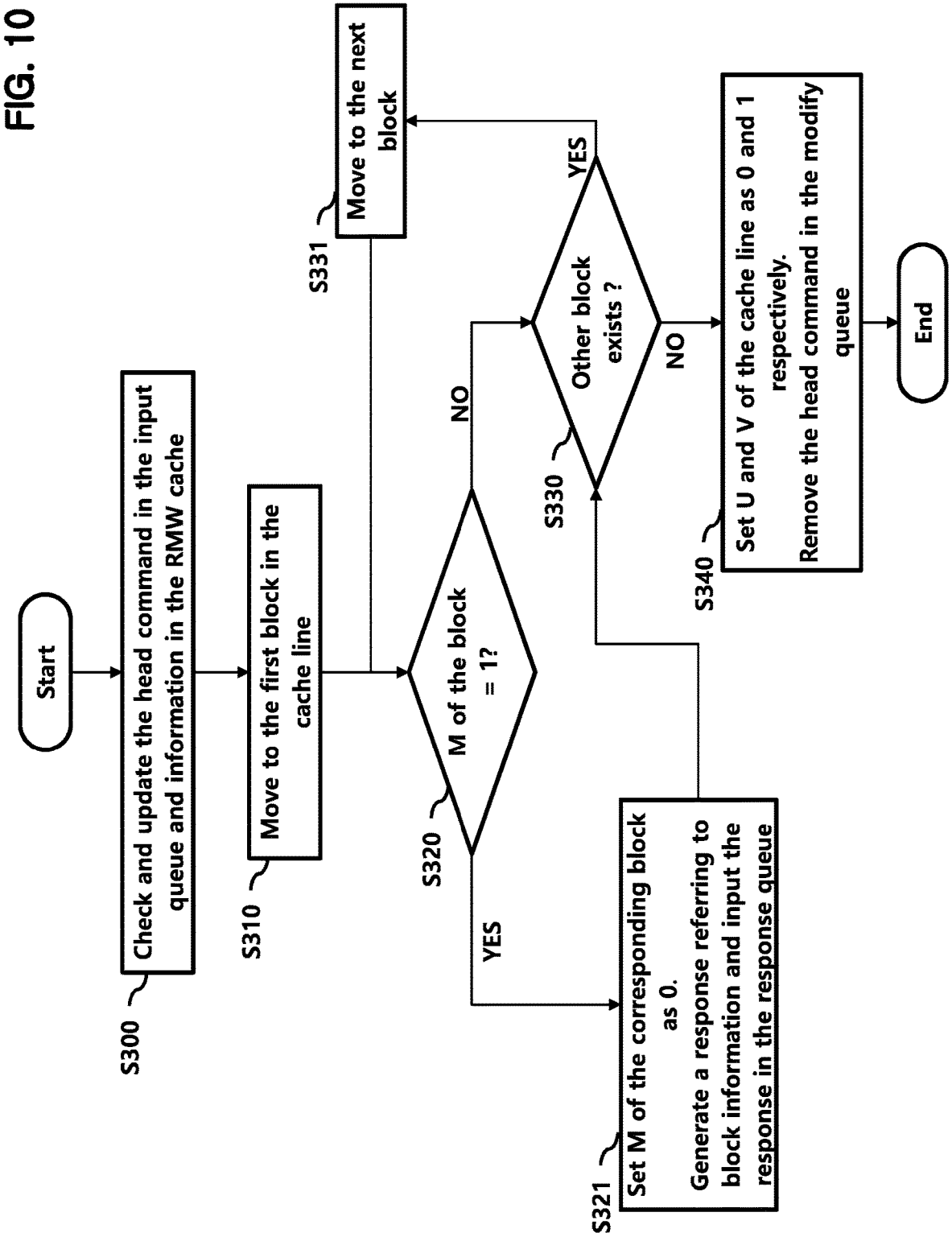

FIGS. 8 to 10 are flow charts showing operations of the RMW controller 100 according to an embodiment of the present disclosure.

FIG. 8 shows a process 800 for processing a head command in the input queue 140.

First, the head command of the input queue 140 is checked at step S100.

Thereafter, the RMW cache 110 determines whether a cache line corresponding to the head command exists at step S110.

If there exists a cache line corresponding to the head command, the process 800 moves to the step S111. If the cache line corresponding to the head command does not exist, the process 800 moves to the step S120.

At step S111, a cache line is allocated to processing the head command according to the LRU rule.

If there is an empty cache line in the RMW cache 110, the empty cache line is allocated to processing the head command.

If there is no empty cache line, an empty cache line is obtained by selecting a least recently used (LRU) cache line and evicting it. For this, the count value COUNT of each cache line may be checked to select a cache line having the smallest count value COUNT.

When evicting the selected cache line, a write operation is performed on the corresponding entry if the dirty flag D is set.

When a new cache line is allocated, tag information and index information of the LUT 121 included in the address decoder 120 are updated together to maintain consistency between the LUT 121 and the RMW cache 110.

Thereafter, at step S112, the in-process flag U and valid flag V of the newly allocated cache line are set to 1 and 0 respectively.

Subsequently, at step S113, the merge flag M is set to 1 in the block corresponding to the head command. When the head command is a write command, the command type flag T of the corresponding block is set to W, the dirty flag D of the cache line is set to 1, and the data for the write command is written to the data field of the corresponding block. Otherwise, when the head command is a read command, the command type flag T of the corresponding block is set to R and the dirty flag D of the cache line is set to 0.

After S113, a merge operation is performed at step S200. The merge operation will be described with reference to FIG. 9.

At step S120, it is determined whether the valid flag V of the cache line is 0.

If a cache line exists, the valid flag V whose value is 0 indicates that a merge command for the corresponding cache line is being processed and the valid flag V whose value is 1 indicates that a merge command for the corresponding cache line has been processed and valid data has been stored thereafter.

If the valid flag V of the cache line is 0, the process 800 moves to step S130, and if the valid flag V of the cache line is 1, the process 800 moves to step S140.

At S130, the process 800 determines whether the merge flag M of a block field corresponding to the head command in the cache line is zero.

If the merge flag M of the corresponding block is 0, since the merge operation has not been performed on the corresponding block, the process 800 proceeds to step S113, described above.

Thus, an additional command can be merged even if a merge command corresponding to the current cache line is already in process.

In the present embodiment, the merge command corresponds to a read command for the entire cache line, so the additional command may be merged.

When the merge flag M of the block corresponding to the head command is 1, it indicates that a command corresponding to the block has been already merged. Therefore, it is preferable to wait until the processing for the previous merge command is completed. To do this, the process moves to step S100 and the above-described operation is repeated.

At step S140, is the process 800 determines whether the head command is a write command.

If the head command is not a write command, that is, if the head command is a read command, the command is input to the response queue 160 to process the command at step S142 since data stored in the cache line is valid.

If the command is a write command, write data is stored in a corresponding block field of the cache line and the dirty flag D of the cache line is set to 1 at step S141.

For a write command, the write command may also be input to the response queue 160 to provide the host 1 with a response corresponding to the write command.

After the steps S141 and S142, the head command is removed from the input queue 140 at step S143, and the next command in the input queue, if any, becomes the head command of the input queue.

When the head command of the input queue 150 is changed, the operations disclosed in FIG. 8 may be repeatedly performed.

FIG. 9 is a flow chart illustrating the merge operation at step S200 of FIG. 8.

At step S210, the head command of the input queue 150 and information corresponding thereto are checked in the RMW cache 110.

At step S220, a pointer moves to indicate a command next to the head command in the input queue 150.

At step S230, whether the address of the pointed-to command corresponds to the same cache line as the head command is determined.

If the pointed-to command corresponds to the same cache line, the process moves to step S240, and if the pointed-to command does not correspond to the same cache line, the process moves to step S250.

In step S240, it is determined whether the merge flag M of the block corresponding to the pointed-to command is 0.

If the merge flag M is not 0, the process moves to step S250. If the merge flag M is 0, since a corresponding command is not merged, the process moves to step S241.

At step S241, the process sets the merge flag M for the corresponding block to 1. When the pointed-to command is a write command, the command type flag T of the corresponding block is set to W and the dirty flag D of the cache line is set to 1. When the pointed-to command is a read command, the command type flag T of the corresponding block is set to R and the dirty flag D of the cache line is not changed.

In the cache line, when the pointed-to command is a write command, respective last write flags L in the other blocks are set to 0, and the last write flag L in the corresponding block is set to 1. Accordingly, only one last write flag L may be set to 1 for only one write command in one cache line.

After that, the process moves to step S250.

The operations from the step S250 corresponds to a process of searching for an additional command to merge in the input queue 140.

First, in step S250, it is determined whether a predetermined waiting time has elapsed.

Whether the predetermined waiting time has elapsed may be determined by comparing the time that has elapsed since the start of step S210 with the predetermined waiting time. In this embodiment, the predetermined waiting time corresponds to 8 cycles.

If the predetermined waiting time has elapsed, the process moves to step S262 without merging further commands.

If the predetermined time has not elapsed, it is determined whether another command exists in the input queue 140 at step S260.

If no other command exists, the process moves to step S262. If another command exists, the process moves to step S261. At step 261, the pointer moves to the next command in the input queue and the process moves to step S230 to repeat the above-described operation.

At step S262, which corresponds to the merge operation being completed, a read command corresponding to the merge command is generated and is provided to the memory controller 200 through the arbiter 170.

Thereafter, merged commands including the head command are removed from the input queue 140, and a read command corresponding to the merge command is input to the modify queue 150.

FIG. 10 is a flow chart illustrating a demerge operation 1000 according to an embodiment of the present disclosure.

The demerge operation 1000 is performed when a response to a merge command, which is a read command, is received from the memory controller 200.

First, information of the head command corresponding to the merge command in the modify queue 150 and the RMW cache 110 are checked and updated at step S300.

The data field of the cache line is updated with the read data for each block field except those block fields corresponding to a write command.

Thereafter, a pointer moves to a first block of the cache line corresponding to the head command of the modify queue at step S310.

It is determined whether the merge flag M in the block field indicated by the pointer is 1 at step S320.

If the merge flag M is 1, which means a corresponding command is merged, an operation at step S321 is performed. If the merge flag M is 0, which means a corresponding command is not merged, an operation at step S330 is performed.

At step S321, the merge flag M of the corresponding block is set to 0, a response is generated using the information included in the block indicated by the pointer, and the generated response is input to the response queue 160.

For example, if the pointed-to block corresponds to a write command, a response to the write command is input to the response queue 160, and if the pointed to block corresponds to a read command, the response and read data corresponding to the read command are input to the response queue 160.

After that, the process moves to step S330.

At step S330, it is determined whether another block exists in the cache line that has not yet been processed by the demerge operation 1000. If another such block exists, the pointer moves to the next such block at step S331, and the demerge operation is repeated as aforementioned.

If no other block that has not yet been processed by the demerge operation 1000 exists, the process proceeds to step S340 where the in-process flag U and valid flag V of the cache line are set to 0 and 1 respectively.

At this time, the head command of the modify queue 150 may be removed.

Figure 11:
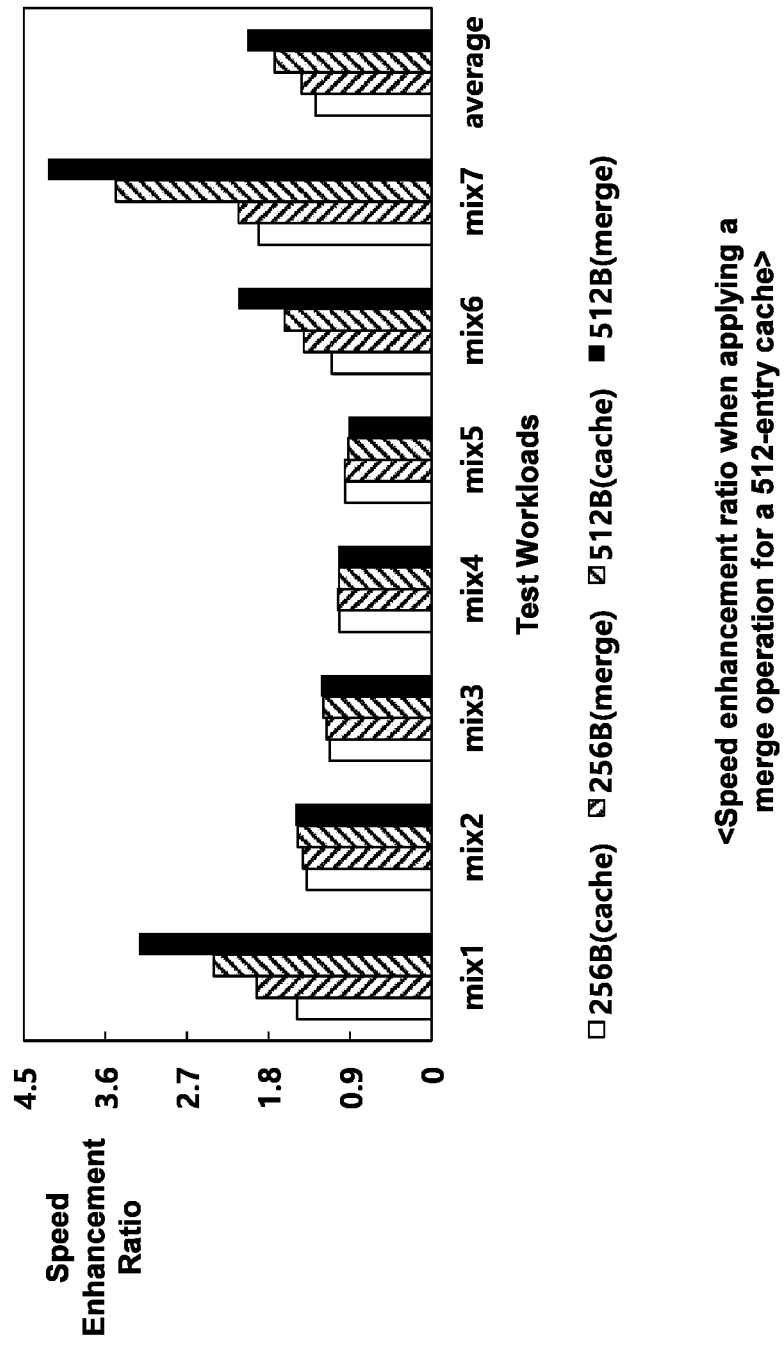
FIGS. 11 and 12 illustrate effects of a semiconductor memory device according to an embodiment of the present disclosure.
Figure 12:
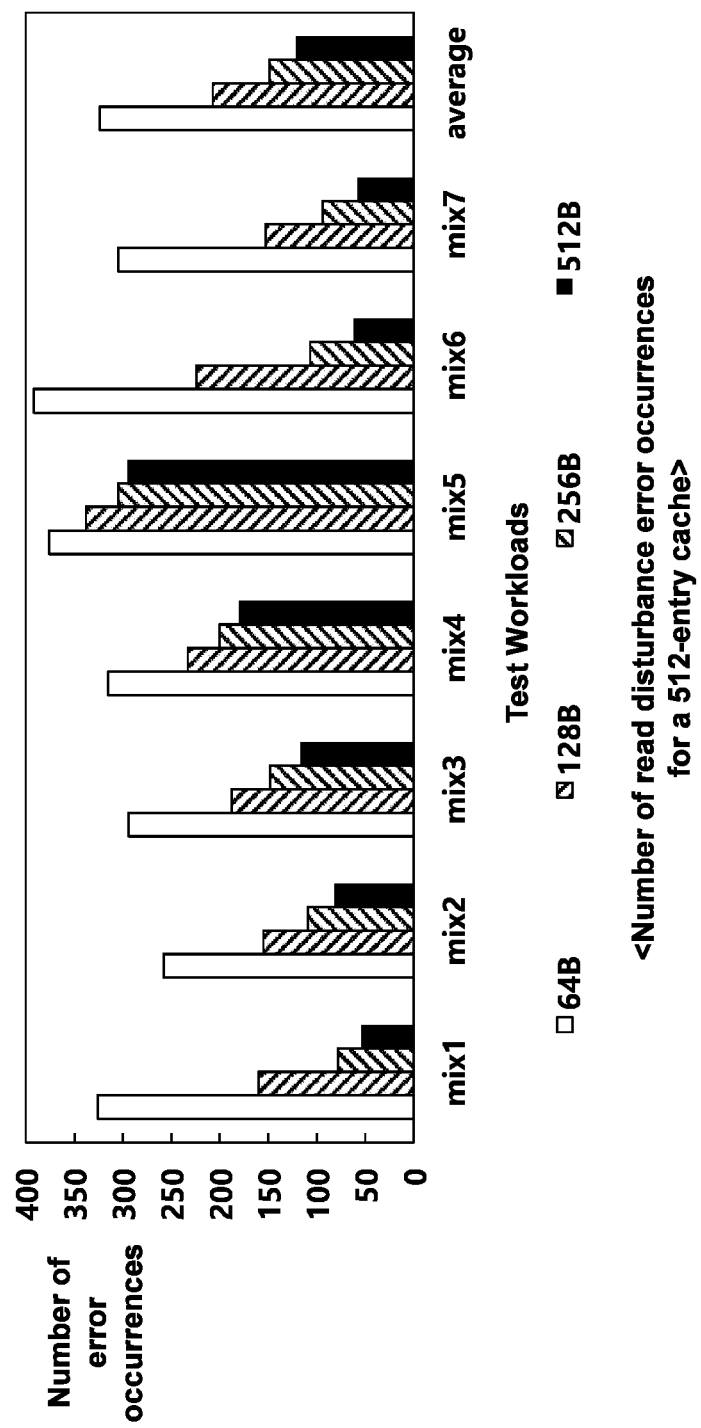

FIGS. 11 and 12 are graphs illustrating effects of a semiconductor memory device according to an embodiment of the present disclosure.

FIG. 11 illustrates a speed enhancement ratio when performing a merge operation using an RMW cache having 512 entries.

In the graph, a legend with "cache" corresponds to a case in which a conventional RMW operation is performed by using a cache without performing a merge operation according to the present disclosure and a legend with "merge" corresponds to a case in which a RMW operation is performed by using a RMW cache performing a merge operation according to the present disclosure.

The horizontal axis shows the test workloads and the average, and the vertical axis shows the speed enhancement ratio.

When the data width of the cache is the same, speed is usually enhanced by performing the merge operation according to the present disclosure as shown in the graph.

FIG. 12 is a graph illustrating number of read disturbance error occurrences when using a RMW cache having 512 entries.

A legend with "64B" corresponds to a case where a conventional cache is used, and the others correspond to cases where a RMW cache having respective size is used according to the present disclosure.

As shown in the graph, number of error occurrences due to read disturbance is reduced when using the RMW cache according to the present disclosure.

This is associated with a reduction of read operations inside the semiconductor memory device by performing a command merge operation using the RMW cache though RMW operations that are performed by the RMW cache.

Although various embodiments have been described for illustrative purposes, it will be apparent to those skilled in the art that various changes and modifications may be made to the described embodiments without departing from the spirit and scope of the disclosure as defined by the following claims.

What is claimed is:

1. A semiconductor memory device comprising:
 a memory device;
 a Read-Modify-Write (RMW) controller configured to:
 generate a merge command corresponding to a plurality of commands that are externally provided, the plurality of commands including at least one command among a read command and a write command,
 receive a processing result of the merge command, and
 generate a response for the at least one command corresponding to the merge command; and
 a memory controller configured to control the memory device by receiving the merge command and to provide the processing result of the merge command to the RMW controller.

2. The semiconductor memory device of claim 1, wherein the RMW controller includes a RMW cache configured to store the at least one command corresponding to the merge command, information on the at least one command, and data corresponding to the at least one command.

3. The semiconductor memory device of claim 2, wherein the RMW controller further includes
 an input queue configured to store a read command and a write command which are externally provided;

a merge controller configured to generate the merge command corresponding to the at least one command selected from the input queue;

a modify queue configured to store the merge command;

a demerge controller configured to update the RMW cache according to the processing result of the merge command, and to generate a response to the at least one command corresponding to the merge command by referring to the RMW cache; and a response queue configured to store a response to the at least one command.

4. The semiconductor memory device of claim 3, wherein the merge controller is configured to:

store a head command of the input queue in a cache line of the RMW cache, generate the merge command by searching for a command in the input queue that can be included in the cache line of the RMW cache with the head command, and remove at least one command corresponding to the merge command from the input queue.

5. The semiconductor memory device of claim 4, wherein the merge controller is configured to search the input queue for a predetermined waiting time after the head command was stored in the RMW cache.

6. The semiconductor memory device of claim 4, wherein when an address corresponding to the head command does not correspond to any allocated cache line in the RMW cache, the merge controller is configured to:

allocate a cache line for the head command, and generate a write command to evict a cache line that is least accessed from the RMW cache when the RMW cache does not have a free cache line to allocate to the head command.

7. The semiconductor memory device of claim 4, wherein the RMW controller further comprises an arbiter configured to determine a processing order of the merge command and a response to send to the memory controller among responses stored in the response queue.

8. The semiconductor memory device of claim 7, wherein the RMW controller further comprises a main controller configured to externally output a response signal by dequeuing a response or a command stored in the response queue or to provide a response or a command stored in the response queue to the arbiter.

9. The semiconductor memory device of claim 2, wherein the RMW controller further comprises an address decoder providing information on a cache line of the RMW cache by using an address corresponding to the at least one command.

10. The semiconductor memory device of claim 9, wherein the address decoder includes a look up table (LUT) storing index information corresponding to a cache line of the RMW cache and tag information corresponding to an address of a cache line of the RMW cache, wherein the tag information and the index information are updated when the RMW cache is updated.

11. The semiconductor memory device of claim 10, wherein the address decoder further includes a comparison circuit configured to compare an address corresponding to a command with tag information stored in the LUT and an index output circuit configured to output an index among the index information stored in the LUT according to an output of the comparison circuit.

12. A computing system comprising:
a host; and
a semiconductor memory device, wherein the semiconductor includes:
a memory device;

a Read-Modify-Write (RMW) controller configured to generate a merge command corresponding to a plurality of commands that are externally provided, the plurality of commands including at least one command among a read command and a write command, to receive processing result of the merge command, and to generate a response for the at least one command corresponding to the merge command; and a memory controller configured to control the memory device by receiving the merge command and to provide the processing result of the merge command to the RMW controller.

13. The computing system of claim 12, wherein the RMW controller includes a RMW cache configures to store the at least one command corresponding to the merge command, information on the at least one command, and data corresponding to the at least one command.

14. The computing system of claim 13, wherein the RMW controller further includes an input queue configures to store a read command and a write command which are externally provided;

a merge controller configured to generate the merge command corresponding to the at least one command selected from the input queue;

a modify queue configures to store the merge command;

a demerge controller configured to update the RMW cache according to the processing result of the merge command, and to generate a response to the at least one command corresponding to the merge command referring to the RMW cache; and a response queue configures to store a response to the at least one command.

15. The computing system of claim 14, wherein the merge controller is configured to store a head command of the input queue in a cache line of the RMW cache, to generate the merge command by searching for a command in the input queue that can be included in the cache line with the head command, and to remove at least one command corresponding to the merge command from the input queue.

16. The computing system of claim 13, wherein the RMW controller further comprises an address decoder providing information on a cache line of the RMW cache by using an address corresponding to the at least one command.

17. The computing system of claim 16, wherein the address decoder includes a look up table (LUT) storing index information corresponding to a cache line of the RMW cache and tag information corresponding to an address of a cache line of the RMW cache, wherein the tag information and the index information are updated when the RMW cache is updated.

18. An operation method of a semiconductor memory device comprising:

storing a read command and a write command which are externally provided to an input queue;

storing a head command stored in the input queue into a Read-Modify-Write (RMW) cache;

updating the RMW cache by searching for at least one command among read commands and write commands stored at the input queue each having an address that may be accessed with the head command and generating a merge command from the head command and the at least one command;

receiving processing result corresponding to the merge command;

updating the RMW cache according to the merge command and the processing result; and providing a response to the at least one command corresponding to the merge command with reference to the RMW cache.

19. The operation method of claim 18, wherein storing a head command stored in the input queue into a RMW cache comprises:

searching for a cache line of the RMW cache corresponding to the head command;

allocating a new cache line when a cache line corresponding to the head command is not found and setting the new cache line as a cache line corresponding to the head command; and storing information on the head command to a cache line corresponding to the head command and enabling an in-process flag of the cache line corresponding to the head command.

20. The operation method of claim 19, further comprising: storing the information on the head command to a cache line corresponding to the head command when a cache line corresponding to the head command was found and the in-process flag is enabled; and performing an operation corresponding to the merge command setting a next command to the head command as new head command when a cache line corresponding to the head command is found and the in-process flag is disabled.

21. The operation method of claim 18, wherein generating the merge command is performed for a predetermined waiting time after information of the head command is stored in the RMW cache.

22. The operation method of claim 18, wherein generating the merge command comprises:

updating a cache line corresponding to the head command by using information on the at least one command corresponding to the merge command;

removing the at least one command corresponding to the merge command from the input queue; and providing the merge command to the memory device.

23. The operation method of claim 18, updating the RMW cache according to the merge command and the processing result comprises:

updating data on a command which is not a write command among the at least one command corresponding to the merge command by using the processing result.

24. The operation method of claim 18, providing a response to the at least one command corresponding to the merge command with reference to the RMW cache comprises:

storing a response to a read command corresponding to the merge command with data in the response queue;

storing a response to a write command corresponding to the merge command in the response queue; and outputting a response by dequeuing the response queue.

* * * * *